Oct. 16, 1962 L. I. KAPLAN 3,058,788
ANTI-FRICTION BEARING
Filed May 25, 1960 2 Sheets-Sheet 1
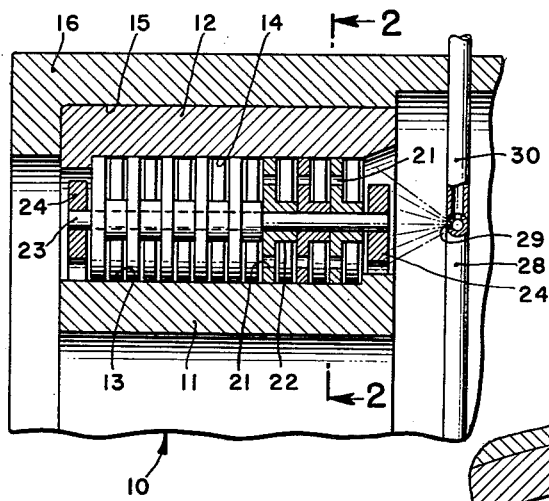
FIG. 1.
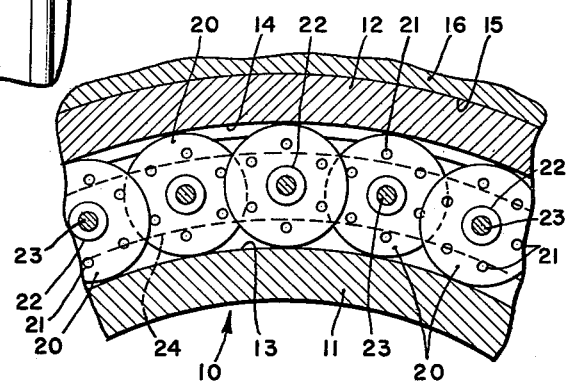
FIG. 2.
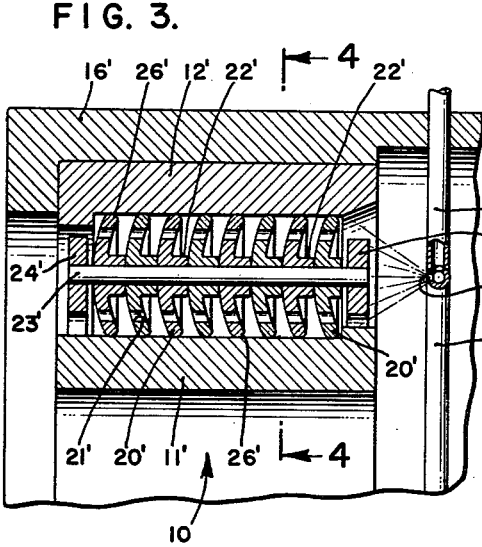
FIG. 3.
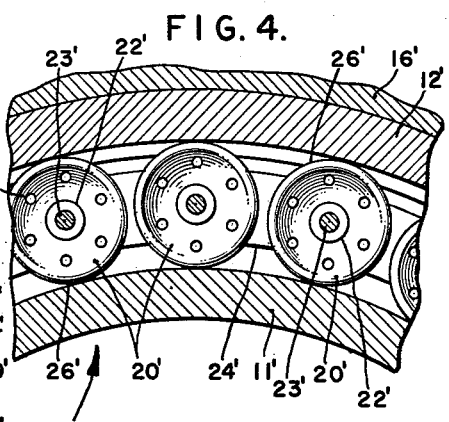
FIG. 4.
LEO I. KAPLAN
INVENTOR.
ATTORNEYS.

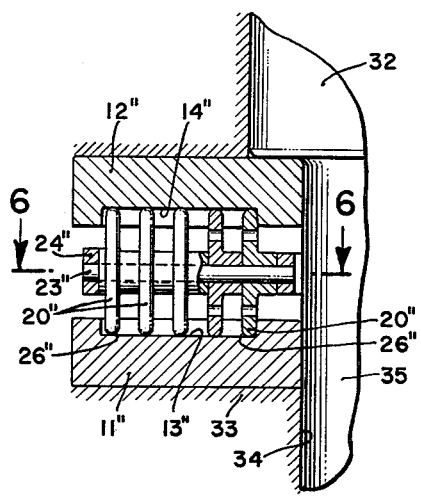
FIG. 5.
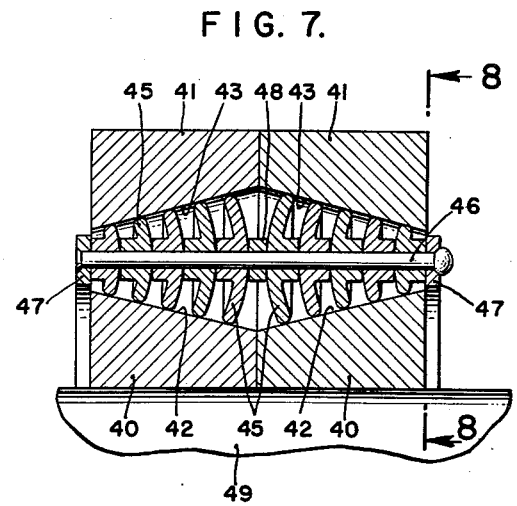
FIG. 7.
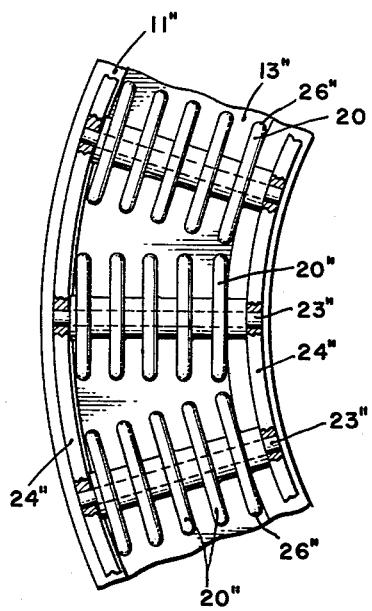
FIG. 6.
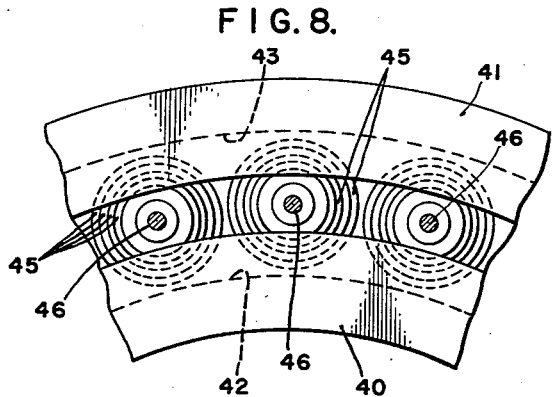
FIG. 8.
LEO I. KAPLAN
INVENTOR.
BY 
ATTORNEYS.

3,058,788
ANTI-FRICTION BEARING
Leo I. Kaplan, Sunland, Calif., assignor to Poly Industries, Inc., Pacoima, Calif., a corporation of California
Filed May 25, 1960, Ser. No. 31,627
15 Claims. (Cl. 308—187)

This invention relates to anti-friction bearing assemblies and more particularly to an improved anti-friction bearing wherein the anti-friction elements comprise rows of thin disc elements supported in circumferentially spaced relation between opposed raceways, the individual discs being formed of thin, resilient material having relatively large heat dissipating surfaces.

The present application is a continuation-in-part of my co-pending application for United States Letters Patent, Serial No. 536,450, filed September 26, 1955, and entitled Disc Type Roller Bearing.

Roller anti-friction bearing assemblies have certain advantages over ball type bearing assemblies in that the load concentration on both the anti-friction elements and on the supporting raceways can be reduced and, at the same time, the load carrying ability of the raceways can be increased. However, there remains a serious problem under high load and/or high speed operating conditions arising from molecular heat generated between the contacting surfaces by reason of the deformation of these surfaces under load and the difficulty of dissipating this heat to maintain the operating temperature of the bearing parts below harmful levels. A principal cause of molecular friction is the imposition of the high concentrated load forces on the portions of the anti-friction elements in direct contact with the raceway. This load concentration causes deformation of both the anti-friction element and of the raceway. In consequence, this progressively occurring deformation and the relief of this deformation as the anti-friction member advances generates molecular friction within the material so distorted causing serious temperature rises leading to overheating and premature failure of the bearing particularly when operated at high speed and subjected to severe distortion.

Cylindrical or roller bearings have the advantage over ball bearings in that there is line rather than point contact between the elements and the raceway but there is an attending disadvantage owing to the greater mass of the roller element and its smaller surface area in proportion to the load carried. There is therefore less opportunity for the generated heat to dissipate rapidly enough to prevent overheating of the bearing as well as disadvantageous changes in the physical properties of the component materials.

In view of the above factors and shortcomings characteristic of prior anti-friction bearings, it is the purpose of the present invention to provide an improved anti-friction bearing assembly avoiding the shortcomings and disadvantages of prior assemblies and featuring the use of a multiplicity of thin resilient disc anti-friction elements having large heat dissipating surface areas to facilitate the rapid dissipation of heat and held assembled under preload irrespective of the presence of external loading. Owing to the preloading of all components of the assembly, continuous rolling contact is maintained between both raceways and all anti-friction elements. In consequence, the application of a heavy external load does not result in loss of continuous contact between the anti-friction elements and the associated raceways. It follows that there is no opportunity for the roller elements to lose relative rolling speed at any time and consequently there is no need for quickly restoring the roller elements back to operating speed as is commonly true in bearing assemblies. This major cause of molecular friction is thereby completely eliminated along with the attending generation of heat. Heat unavoidably generated by deformation of the roller elements and of the raceways during rolling contact is quickly and efficiently dissipated from the large surface areas of the axially thin discs.

Another feature of the present bearing assembly is that the thin wafer-like discs are preferably formed of resilient material as an aid in maintaining all elements constantly under preload and helpful in compensating for minor imperfections or irregularities or departure from tolerance specification of the contact surfaces of the raceways. Further aiding in maintaining all elements under continuous preload is a disc design of slightly dished configuration. This shape, taken in combination with the resiliency of the material, further increases the adaptability and flexibility of the bearing assembly under actual operating conditions for reasons which are readily apparent in view of the foregoing objectives and structural characteristics of the present invention.

Accordingly, it is a primary object of the present invention to provide an improved anti-friction bearing assembly having numerous features including resilient preloaded disc-type anti-friction elements.

Another object of the invention is the provision of a preloaded anti-friction bearing assembly featuring disc-type anti-friction elements arranged in rows in spaced-apart relation circumferentially of the bearing raceways.

Another object of the invention is the provision of an anti-friction bearing assembly the individual anti-friction components of which are relatively thin and have wide surface areas effective in the dissipation of heat.

Another object of the invention is the provision of an improved bearing assembly in which the individual anti-friction elements comprise relatively thin discs of material and are so designed as to deflect slightly under design load and to the extent necessary to compensate for slight size variations.

Another object of the invention is the provision of an improved anti-friction bearing element having a rounded peripheral rim contour.

Another object of the invention is the provision of an anti-friction bearing assembly the anti-friction elements of which comprise discs arranged in rows and individually and freely rotatable about common supporting shafts the ends of which are suitably supported.

Another object of the invention is the provision of a bearing assembly utilizing disc shaped anti-friction elements arranged in rows with the discs of a given row varying in diameter to simulate a tapered roller bearing element but having distinct advantages thereover.

Another object of the invention is the provision of an anti-friction bearing assembly together with means for circulating a coolant fluid therepast to carry away frictional and molecular heat.

An additional object of the invention is the provision of a disc-type bearing in which the rims of adjacent rows of discs overlap to provide an increased number of points of contact between the discs and the races and thereby the load-carrying ability of the assembly.

Another object of the invention is the provision of a disc-type roller bearing in which each disc is provided with axial openings materially increasing the heat dissipating area and facilitating the passage of lubricating and cooling fluid through and within the assembly.

These and other more specific objects will appear upon reading the following specification and claims and upon considering in connection therewith the attached drawings to which they relate.

Referring now to the drawings in which a preferred embodiment of the invention is illustrated.

FIGURE 1 is a transverse cross-sectional view taken radially through one preferred embodiment incorporating features of the invention;

FIGURE 2 is a fragmentary view taken along line 2—2 on FIGURE 1;

FIGURE 3 is a view similar to FIGURE 1 but showing a modified design of the anti-friction elements;

FIGURE 4 is a cross-sectional view taken along line 4—4 on FIGURE 3;

FIGURE 5 is a fragmentary view taken radially through a thrust bearing according to the present invention;

FIGURE 6 is a fragmentary view taken partly in section along line 6—6 on FIGURE 5;

FIGURE 7 is a cross-sectional view of still another embodiment of the invention for use between a shaft and a supporting framework therefor; and FIGURE 8 is a sectional view taken along line 8—8 on FIGURE 7.

Referring to a first preferred embodiment of the invention shown in FIGURES 1 and 2, an anti-friction bearing assembly according to the present invention designated generally 10 will be understood as having inner and outer concentrically arranged raceway rings 11, 12. Each ring has annular smooth surfaces 13, 14, respectively, suitably hardened and forming high-precision contacting surfaces along which the anti-friction elements roll under load. In the assembly here shown, outer raceway ring 12 is shown pressed into tight frictional engagement with the side wall 15 of a supporting housing 16. While not so shown, it will be understood that inner ring 11 preferably has a press fit with a shaft, the hub of a pulley, gearing or the like.

The anti-friction elements comprise a plurality of identical discs 20 of high strength resilient material. Each disc comprise a main body of wafer-like configuration having an axial thickness which is relatively small in comparison with its diameter, and is formed with a plurality of small axial openings 21 through which a suitable coolant and/or lubricant may pass to facilitate the dissipation of heat and the passage of a lubricating medium throughout the bearing assembly. Integral with the center portion of each disc is a hub 22 having a length appreciably greater than the thickness of the main body of the disc, as is clearly shown in FIGURE 1, to the end that the rim portions of adjacent rows of discs may interleave without actual contact with one another. This hub serves to maintain the elements uniformly spaced from one another along a common supporting shaft 23 supported at its opposite ends in cage rings 24. It is pointed out and emphasized that the elements are freely rotatable on shaft 23.

As shown in FIGURES 1 and 2 the peripheral rims of the discs are cylindrical and have line contact with the juxtaposed annular surfaces 13 and 14 of rings 11 and 12. A sufficient number of elements are assembled on each of shafts 23 to span the axial width of surfaces 13 and 14. The shafts 23 may be spaced sufficiently apart for the rims of the elements in adjacent rows to be spaced slightly circumferentially of the bearing. However, greater load carrying capacity is achieved by assembling the hubs 22 of the elements in adjacent rows to face in opposite directions to the end that the rims of the discs in adjacent rows may interleave with one another in the manner made clear by FIGURE 2. This permits the assembly of a greater number of elements and rows thereof between a given pair of rings with the results that the load carried by each disc is less. It follows that the overall load capacity of the bearing is increased because of the larger number of discs present and capable of sharing the load.

An important feature of the assembly and design is the use of elements having a slightly greater diameter than the radial distance between the concentrically arranged race surfaces 13 and 14. In consequence, it will be recognized that both the raceway rings and the anti-friction discs are under preload when fully assembled and that this is true quite independently of whether an external load is being applied to the assembly. In other words, the resilient discs themselves are under compression diametrically along lines passing through the axis of the two raceway rings and of the shaft supporting the disc elements. Not only are the discs themselves slightly deformed within their elastic limits, but so are the surfaces 13 and 14 adjacent the lines of contact of the discs therewith. The degree of preload may vary over wide ranges and may be sufficiently high to exceed the deformation produced by the design load intended to be applied to the assembly. Under these circumstances, it will be evident that the application of the external load will not add to the deformation of any part of the assembly since the preload conditions have already produced a greater deformation.

It will also be recognized from the foregoing that the assembly of the components under preload conditions acts to apply forces along inner ring 11 acting radially inwardly from surface 13 thereby tending to contract this ring and placing it under hoop compression. On the other hand the preload forces applied by the discs against surface 14 of outer ring 12 act radially outward thereby tending to stretch ring 12 and placing it in hoop tension. As has already been mentioned, individual discs are each loaded in compression along lines extending diametrically in a direction passing through the axis of shaft 23 and the shaft supporting ring 11.

Desirably, suitable means are provided for carrying away the molecular heat of deformation and of friction as, for example, an annular distributing manifold 28 arranged opposite one end of shaft 23. This manifold is provided with perforations 29 through which a gas, liquid or vapor may be sprayed under pressure from a supply pipe 30 and directly axially into the end of the bearing assembly. The spray or mist passes over the surfaces of discs 20 and through openings 21 absorbing heat for conduction from the assembly along with the coolant fluid.

Referring now to FIGURES 3 and 4 there is shwon a second preferred embodiment generally similar to that just described and wherein the same or similar parts are designated by the same reference characters distinguished by the addition of a prime. An important difference of this embodiment resides in the fact that disc elements 20' are of dished configuration and in that their peripheral rims 26' are rounded to provide point rather than line contact with the juxtaposed bearing surfaces of ring 11', 12'. It will be apparent that the dished configuration facilitates the elastic and resilient deflection of these elements under load.

The elastic nature of the constituent material of the discs taken together with their wafer-like design enables a substantial portion of the discs to deflect under load with the result that the heat of molecular friction is developed over a much larger or more widely distributed volume of the anti-friction elements than is true of prior anti-friction element design. Thus in prior designs the deformation under load is relatively confined and restricted to the immediate zone about the point or line of contact. Such is not true of the present anti-friction elements with the result that the developed heat is more widely distributed and is dissipated more quickly and readily.

Referring to FIGURES 5 and 6 the principles of the invention are shown applied to a thrust bearing. Thus it will be understood that the raceway rings 11", 12", have their respective highly finished bearing surfaces 13", 14", extending parallel to one another and radially with respect to the shouldered shaft 32 with which ring 12" has a press fit or is otherwise suitably fixedly secured. Bearing ring 11" on the other hand is suitably fixedly secured to a frame, housing or other means 33 having a bore 34 fitting loosely over reduced portion 35 of shaft 32. Accordingly, ring 11" remains stationary whereas raceway ring 12" revolves with shaft 32.

Anti-friction discs 20" differ from those shown in FIGURE 1 in having rounded peripheral rims 26" although it will be understood they may be provided with cylindrical peripheral surfaces if so desired. Another distinction from the embodiment shown in FIGURES 1 to 4 is that the construction of FIGURES 5 and 6 is not preloaded for obvious reasons. However, it is pointed out and emphasized that slight variations in manufacturing tolerances of the discs or in the contour of their rounded rims 26" is compensated for within the principles of this invention by reason of the resiliency of the material forming the discs and the relative thinness of their main bodies with respect to their diameters.

Still another embodiment of the present invention is shown in FIGURES 7 and 8. This embodiment is designed to function as a combination thrust and radial bearing, it being pointed out that the inner and outer raceway ring assemblies each include a pair of identical rings 40, 40 and 41, 41. As shown, the corresponding rings of each pair are identical in configuration, but one is rotated 180 degrees from the other in order that their inclined raceway surfaces 42, 42 will be inclined in opposite directions and cooperate in forming a raceway surface of V-shape in cross-section. Likewise, it will be understood the outer pair of rings 41, 41 are arranged similarly in order that their raceway surfaces 43, 43 will provide a V-shaped configuration.

The anti-friction disc-like elements 45 are of dished configuration and of different diameters such that when assembled in rows on shaft 46 the rims of the discs of each row will have rolling contact with the juxtaposed surface area of raceway surfaces 42, 43, respectively. Stated differently, it will be appreciated that the discs of each row will simulate the general shape of a double tapered roller bearing. Preferably, discs 45 are designed for assembly in preloaded condition and their rim edges are rounded similarly to the corresponding construction described in the preceding embodiment. The supporting shafts 46 for each row of discs have their opposite ends mounted in cage rings 47. As in the preceding embodiment each of discs 45 is free to rotate independently of the others on shaft 46 and the larger discs on a given shaft face in opposite directions and are separated by a spacer roller 48. Inner race rings 40, 40 have a press fit with shaft 49 while outer race rings 41, 41 may be similarly mounted in a stationary housing or suitably joined together by means not shown.

It will be recognized from a consideration of FIGURE 7 that the discs having dished surfaces facing in one direction will be effective in resisting thrust loads applied from the opposite direction whereas the corresponding discs on the opposite end of the same shaft will be equally effective in resisting thrust loads from the opposite direction. For this reason the last described embodiment provides a structure highly effective in resisting both radial and axially applied thrust loads.

Although the surfaces of the raceway rings of FIGURES 7 and 8 are shown converging toward one another as viewed in transverse section, it is pointed out that these surfaces may be oppositely inclined as to diverge from one another. When designed in the mentioned alternate manner, the discs are assembled in reverse order with the small diameter discs near the center portions of shafts 46, and the larger discs spaced remotely from one another.

While the particular anti-friction bearing herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A roller bearing, which comprises first and second concentrically arranged race ring members having facing cylindrical bearing surfaces, a cage including a plurality of laterally spaced shafts located between said race members, and a plurality of substantially identical roller discs mounted on said shafts and each engaged at its periphery with both of said race members, said discs being freely and independently rotatable on said shafts and being relatively thin in comparison to their diameters so as to have relatively large heat-dissipating surfaces and each having an integral relatively small diameter spacer hub serving to hold said discs accurately spaced from one another, said hubs having an axial thickness slightly greater than the thickness of the body of said thin discs and being effective to hold the surfaces of adjacent discs spaced apart by a distance in excess of the thickness of said discs to provide space for the free flow of a heat-dissipating medium.

2. The invention as claimed in claim 1 in which said discs have unrestricted openings offset from the axis thereof adapted to increase the heat dissipating area thereof and to permit passage of cooling and lubricating fluid therethrough.

3. The invention as claimed in claim 1 in which said discs are dished.

4. The invention as defined in claim 3 characterized in that said discs have rounded peripheral rim edges.

5. The invention as defined in claim 1 characterized in that said discs are formed of resilient material and are adapted to deflect slightly under load from the normal plane of said discs when not under load.

6. The invention as defined in claim 1 characterized in the provision of means for passing cooling fluid past said discs while said discs are rotating under load for the purpose of absorbing heat therefrom.

7. A roller bearing comprising inner and outer race ring members having opposed radially spaced concentric cylindrical surfaces, a cage including a plurality of circumferentially spaced shafts located midway between said surfaces and extending axially of said race members, and a plurality of discs mounted freely on and lying normal to the axis of each of said shafts and having diameters substantially equal to the spacing between said surfaces, said discs being relatively thin in comparison to their diameters in order to provide effective heat dissipation surfaces, the heat dissipating portions of said discs being provided with cooling medium flow passages and being held in axially spaced relation by integral hubs having an axial length greater than the thickness of said discs.

8. The invention as claimed in claim 7, in which said thin discs are dished to facilitate flexing of their rim portions during loading of the assembly.

9. The invention as claimed in claim 7, in which said discs are planar and are staggered relative to the discs on adjacent shafts, and in which said shafts are spaced apart by distances less than the diameters of said discs so that rim portions of said discs overlap.

10. A preloaded anti-friction bearing assembly comprising a pair of continuous concentric raceway rings the outer one of which is maintained in hoop tension and the inner one of which is held under hoop compression by a plurality of intervening rows of resilient disc-like anti-friction elements of dished form each having a rounded peripheral rim and a nominal unloaded diameter slightly in excess of the radial spacing between the facing annular surfaces of said raceway rings, the dished form of said elements taken with the resiliency of the constituent material permitting the main body portion of said elements to deflect under load thereby to distribute deformation of the discs over a much larger zone than normally.

11. A preloaded bearing assembly as defined in claim 10 characterized in that said disc-like elements are relatively thin, and said bearing assembly including means for holding said anti-friction elements spaced apart by a distance slightly greater than the thickness thereof.

12. A preloaded bearing assembly as defined in claim 10 characterized in that the facing surfaces of said raceway rings are oppositely inclined to one another axially of said rings to provide frusto-conical bearing surfaces, and in that said disc-like anti-friction elements in a given row thereof are of graduated diameters to conform with the angle of taper of the juxtaposed frusto-conical surfaces of said concentric raceway rings.

13. An anti-friction bearing assembly adapted to resist both axial and radial loads comprising inner and outer continuous concentric race ring means each axial half of which have continuous opposed facing annular race surfaces inclined oppositely to one another axially of said bearing assembly and oppositely to the inclination of the related race surfaces of the other half of said race ring means, a plurality of rows each including a plurality of disc-like anti-friction elements mounted on shafts and distributed circumferentially between said race surfaces, the elements in each row being graduated in size with the rims of each adapted to have simultaneous rolling contact with radially aligned points of contact with the race surfaces of said raceway ring means, and cage means supporting the ends of said shafts.

14. An anti-friction bearing assembly as defined in claim 13 characterized in that said annular race surfaces on either lateral half of each ring slope in opposite directions with respect to a median plane therethrough lying perpendicular to the axes of said concentric rings.

15. An anti-friction bearing assembly as defined in claim 13 characterized in that said disc-like elements are relatively thin, dished and formed of elastic material.

References Cited in the file of this patent

UNITED STATES PATENTS

| | | |
|---|---|---|
| 849,488 | Morse | Apr. 9, 1907 |
| 877,630 | Bussman | Jan. 28, 1908 |
| 983,792 | Whitney | Feb. 7, 1911 |
| 2,174,261 | Griswold | Sept. 26, 1939 |

FOREIGN PATENTS

| | | |
|---|---|---|
| 4,250 | Great Britain | 1902 |